United States Patent
Wu et al.

(10) Patent No.: US 10,841,846 B2
(45) Date of Patent: Nov. 17, 2020

(54) METHOD AND APPARATUS

(75) Inventors: Chunli Wu, Beijing (CN); Benoist Pierre Sebire, Tokyo (JP)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 14/348,676

(22) PCT Filed: Sep. 29, 2011

(86) PCT No.: PCT/EP2011/067044
§ 371 (c)(1),
(2), (4) Date: Mar. 31, 2014

(87) PCT Pub. No.: WO2013/044969
PCT Pub. Date: Apr. 4, 2013

(65) Prior Publication Data
US 2014/0241320 A1 Aug. 28, 2014

(51) Int. Cl.
*H04W 36/02* (2009.01)
*H04L 1/18* (2006.01)

(52) U.S. Cl.
CPC ......... *H04W 36/023* (2013.01); *H04L 1/1841* (2013.01); *H04W 36/02* (2013.01)

(58) Field of Classification Search
CPC . H04W 80/04; H04W 36/18; H04W 36/0011; H04W 36/14; H04W 36/08
USPC ......................................... 370/331
See application file for complete search history.

(56) References Cited

U.S. PATENT DOCUMENTS

| | | | | |
|---|---|---|---|---|
| 7,386,298 B2* | 6/2008 | Beach | ................ | H04L 12/4625 370/313 |
| 8,284,734 B2* | 10/2012 | Meylan | ............ | H04W 36/0055 370/331 |
| 8,295,841 B2* | 10/2012 | Hwang | ................ | H04W 36/06 370/331 |
| 8,320,327 B2* | 11/2012 | Pani | ...................... | H04W 36/02 370/331 |
| 8,509,796 B2* | 8/2013 | Lee | ......................... | H04L 5/003 370/331 |
| 8,625,486 B2* | 1/2014 | Wang | ............... | H04W 74/0833 370/328 |

(Continued)

FOREIGN PATENT DOCUMENTS

| AU | 2009 245823 A1 | 12/2009 |
|---|---|---|
| CN | 101114992 A | 1/2008 |

(Continued)

OTHER PUBLICATIONS

3GPP TS 36.331 V10.2.0 (Jun. 2011), "$3^{rd}$ Generation Partnership Project; Technical Specification Group Radio Access Network; Evolved Universal Terrestrial Radio Access (E-UTRA); Radio Resource Control (RRC); Protocol specification (Release 10)", 294 pgs.

(Continued)

*Primary Examiner* — Peter G Solinsky
*Assistant Examiner* — Sanjay K Dewan
(74) *Attorney, Agent, or Firm* — Harrington & Smith (57) ABSTRACT

A method is provided. The method includes performing a media access control reset. The media access control reset is provided without performing at least one of a radio link control reset and a packet data convergence protocol reset.

16 Claims, 4 Drawing Sheets

(56) References Cited

U.S. PATENT DOCUMENTS

| | | | |
|---|---|---|---|
| 8,693,435 B2* | 4/2014 | Terry | H04L 1/1685 370/331 |
| 8,837,424 B2* | 9/2014 | Chun | H04J 11/0069 370/331 |
| 9,014,141 B2* | 4/2015 | Kim | H04L 5/001 370/331 |
| 9,191,810 B2* | 11/2015 | Kuo | H04W 12/001 |
| 9,301,134 B2* | 3/2016 | Wager | H04L 63/061 |
| 2003/0016698 A1* | 1/2003 | Chang | H04L 1/1803 370/469 |
| 2007/0064647 A1* | 3/2007 | Prasad | H04L 63/0869 370/331 |
| 2009/0041246 A1* | 2/2009 | Kitazoe | H04W 12/02 380/270 |
| 2009/0046641 A1* | 2/2009 | Wang | H04W 74/0866 370/329 |
| 2009/0086676 A1 | 4/2009 | Meylan et al. | 370/331 |
| 2009/0092079 A1* | 4/2009 | Marinier | H04L 1/1835 370/328 |
| 2009/0149189 A1* | 6/2009 | Sammour | H04L 1/165 455/450 |
| 2009/0180443 A1 | 7/2009 | Kawasaki et al. | 370/331 |
| 2009/0201881 A1 | 8/2009 | Chun et al. | 370/331 |
| 2009/0257408 A1* | 10/2009 | Zhang | H04L 1/1621 370/336 |
| 2010/0040022 A1* | 2/2010 | Lindstrom | H04W 36/0055 370/331 |
| 2010/0142494 A1* | 6/2010 | Hsu | H04L 1/189 370/336 |
| 2010/0202398 A1* | 8/2010 | Terry | H04L 1/1685 370/329 |
| 2010/0238872 A1* | 9/2010 | Kim | H04W 74/008 370/329 |
| 2010/0254351 A1* | 10/2010 | Wang | H04J 11/0069 370/332 |
| 2010/0303039 A1* | 12/2010 | Zhang | H04L 5/0035 370/331 |
| 2011/0002262 A1 | 1/2011 | Wang et al. | |
| 2011/0021154 A1* | 1/2011 | Marinier | H04W 72/02 455/67.11 |
| 2011/0149913 A1* | 6/2011 | Park | H04W 36/0085 370/332 |
| 2011/0207465 A1* | 8/2011 | Dwyer | H04W 72/02 455/450 |
| 2011/0280212 A1* | 11/2011 | Lv | H04W 74/002 370/329 |
| 2011/0305220 A1* | 12/2011 | Lindoff | H04W 28/26 370/331 |
| 2012/0026980 A1* | 2/2012 | Gao | H04W 36/0077 370/331 |
| 2012/0051325 A1* | 3/2012 | Pani | H04W 36/02 370/331 |
| 2012/0069819 A1* | 3/2012 | Park | H04W 76/046 370/331 |
| 2013/0022023 A1* | 1/2013 | Aydin | H04W 36/28 370/331 |
| 2013/0028207 A1 | 1/2013 | Okubo et al. | 370/329 |
| 2013/0044668 A1* | 2/2013 | Purnadi | H04W 36/0007 370/312 |
| 2013/0114813 A1* | 5/2013 | Chai | H04W 12/04 380/270 |
| 2013/0215837 A1* | 8/2013 | Marinier | H04L 1/1835 370/329 |
| 2013/0294415 A1* | 11/2013 | Moilanen | H04W 16/14 370/331 |
| 2013/0301541 A1* | 11/2013 | Mukherjee | H04W 74/0833 370/329 |
| 2014/0023043 A1* | 1/2014 | Yang | H04W 36/0072 370/331 |
| 2014/0177593 A1* | 6/2014 | Terry | H04W 36/0005 370/331 |
| 2014/0313987 A1* | 10/2014 | Zhang | H04W 72/0413 370/329 |
| 2014/0334448 A1* | 11/2014 | Langereis | H04W 28/18 370/331 |
| 2015/0036658 A1* | 2/2015 | Mochizuki | H04W 24/10 370/331 |
| 2015/0103749 A1* | 4/2015 | Kela | H04L 5/0055 370/329 |
| 2015/0172973 A1* | 6/2015 | Jeong | H04L 5/001 370/331 |
| 2015/0201357 A1* | 7/2015 | Morioka | H04W 36/0072 370/331 |
| 2015/0304071 A1* | 10/2015 | Koskinen | H04L 1/1838 370/331 |
| 2015/0350896 A1* | 12/2015 | Jeong | H04W 12/04 455/410 |
| 2015/0365849 A1* | 12/2015 | Gao | H04W 36/0083 455/436 |
| 2016/0007249 A1* | 1/2016 | Di Girolamo | H04W 36/0055 370/311 |
| 2016/0366175 A1* | 12/2016 | Basu Mallick | H04L 63/06 |

FOREIGN PATENT DOCUMENTS

| | | |
|---|---|---|
| CN | 101810031 A | 8/2010 |
| CN | 101933364 A | 12/2010 |
| EP | 1 465 369 A1 | 10/2004 |
| JP | 2010/541401 A | 12/2010 |
| JP | 2010-541418 A | 12/2010 |
| JP | 2010/541418 A | 12/2010 |
| JP | 2010541401 A | 12/2010 |
| JP | 2011171837 A | 9/2011 |
| JP | 2012/516586 A | 7/2012 |
| KR | 20090115194 A | 11/2009 |
| WO | WO-2009/045805 A2 | 4/2009 |
| WO | WO-2009/045901 A2 | 4/2009 |
| WO | WO 2010/002692 A1 | 1/2010 |
| WO | WO-2008038367 A | 1/2010 |
| WO | WO-2010085908 A1 | 8/2010 |
| WO | WO-2010/105145 A1 | 9/2010 |

OTHER PUBLICATIONS

3GPP TS 36.321 V10.2.0 (Jun. 2011), "3$^{rd}$ Generation Partnership Project; Technical Specification Group Radio Access network; Evolved Universal Terrestrial Radio Access (E-UTRA); Medium Access Control (MAC) protocol specification (Release 10)", 54 pgs.

3GPP TSG RAN WG2 Meeting #69bis, Beijing, China, Apr. 12-16, 2010, R2-102061, "PCC Change", CATT, 3 pgs.

R2-101156; LG Electronics Inc.; "Reconfiguration in CA"; 3GPP TSG-RAN WG2 #69; Feb. 22-26, 2010; San Francisco, USA.

3GPP TS 36.331 V8.5.0 (Mar. 2009); 3rd Generation Partnership Project; Technical Specification Group Radio Access Network; Evolved Universal Terrestrial Radio Access (E-UTRA) Radio Resource Control (RRC); Protocol specification (Release 8).

Alcatel; "RLC, MAC and HARQ context transfer for intra-eNB hand-over"; R2-063328; 3GPP TSG-RAN#56 WG 2 LTE; Riga, Latvia; Oct. 6-Nov. 10, 2006; whole document (3 pages).

* cited by examiner

METHOD AND APPARATUS

METHOD AND APPARATUS

The invention relates to a method and apparatus and in particular but not exclusively to a method and apparatus and in particular but not exclusively for use in some reconfigurations and/or handovers.

A communication system enables communication between two or more communication devices such as user terminals, base stations and/or other nodes by providing carriers between the communication devices. In a wireless communication system at least a part of communications between at least two stations occurs over wireless interfaces. A user can access a communication system by means of an appropriate communication device or terminal. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

Carrier aggregation can be used to increase performance. In carrier aggregation a plurality of carriers are aggregated to increase bandwidth. Carrier aggregation comprises aggregating a plurality of component carriers into a carrier that is referred to in this specification as an aggregated carrier.

According to a first aspect, there is provided a method comprising: performing a media access control reset without performing at least one of a radio link control reset and a packet data convergence protocol reset.

According to a second aspect, there is provided a computer program comprising computer executable instructions which, when run, are configured to perform the method of the first aspect.

According to a third aspect, there is provided an apparatus, said apparatus comprising at least one processor and at least one memory including computer program code, the at least one memory and computer program code configured to, with the at least one processor, cause the apparatus at least to: perform a media access control reset without performing at least one of a radio link control reset and a packet data convergence protocol reset.

According to a fourth aspect, there is provided a user equipment comprising an apparatus according to the third aspect.

Embodiments will now be described in further detail, by way of example only, with reference to the following examples and accompanying drawings, in which.

In the following certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 1, device 20 of FIG. 2 and control apparatus 30 of FIG. 3 to assist in understanding the technology underlying the described examples.

Figure 1:
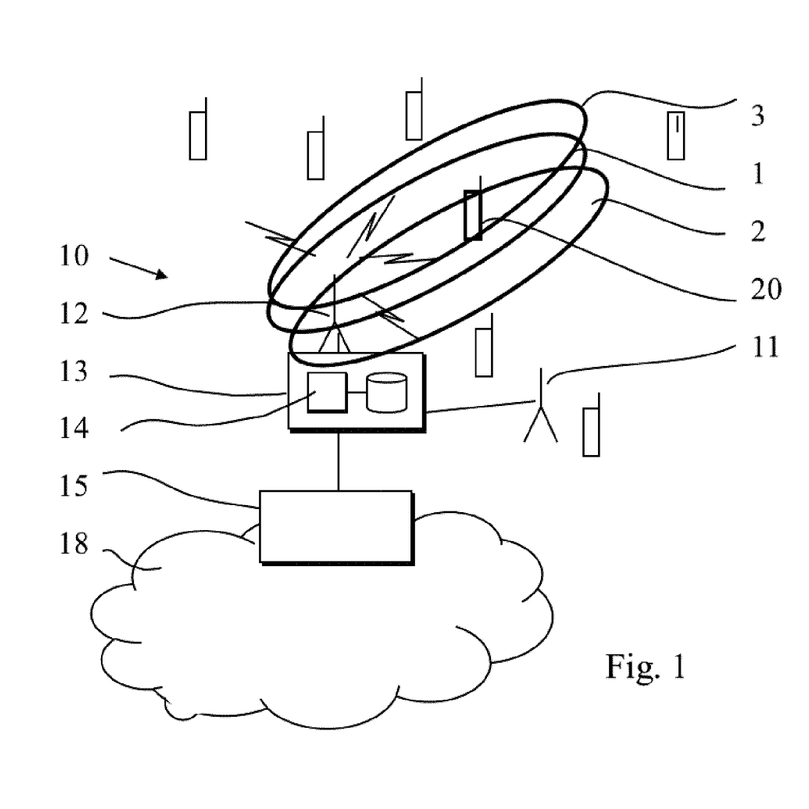
FIG. 1 shows an example of a system wherein below described embodiments may be implemented.

A communication device can be used for accessing various services and/or applications provided via a communication system. In wireless or mobile communication systems the access is provided via a wireless access interface between mobile communication devices and an appropriate access system. A communication device may access wirelessly a communication system via a base station. A base station site can provide one or more cells of a cellular system. A base station can provide, for example, three carriers, each carrier providing a cell. In FIG. 1, for example, a base station 12 is shown to provide three cells 1, 2 and 3. Each cell provides a carrier F1, F2 and F3, respectively. Each communication device 20 and base station may have one or more radio channels open at the same time and may receive signals from more than one source.

It should be appreciated that the number of carriers provided by each base station may be more or less than three and/or may vary over time.

It should be appreciated that in some embodiments, there may be an intra-frequency serving cell change.

It should be appreciated that in some embodiments, there may be serving cell reconfiguration of certain parameters without mobility.

It is noted that at least one of the cells 1 to 3 can be provided by means of remote radio heads of base station 12. In some embodiments at least one of the carriers may be provided by a station that is not co-located at base station 12 but could only be controlled by the same control apparatus as the other cells. This possibility is denoted by station 11 in FIG. 1. For example, block 13 could be used to control at least one further station, for example an intra-eNB. Interaction between the different stations and/or controllers thereof may also be arranged otherwise, for example if a station is provided as an inter-site eNB. The controller of a cell has enough information for all of the aggregated carriers (cells).

A base station is typically controlled by at least one appropriate controller so as to enable operation thereof and management of mobile communication devices in communication with the base station. The control entity can be interconnected with other control entities. The control entity may be part of the base station. In FIG. 1 the controller is shown to be provided by block 13. The controller apparatus may comprise at least one memory, at least one data processing unit and an input/output interface. It shall be understood that the control functions may be distributed between a plurality of control units. The controller apparatus for a base station may be configured to execute an appropriate software code to provide the control functions as explained below in more detail.

In FIG. 1 the base station 12 is connected to a data network 18 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

An example of a standardized architecture is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. A development of the LTE is often referred to as LTE-Advanced (LTE-A).

A communication device can access a communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN). In LTE, an orthogonal frequency division multiple (OFDMA) access technique is used.

A non-limiting example of a base station of a cellular system is what is termed as a NodeB or evolved NodeB (eNB) in the vocabulary of the 3GPP specifications.

Figure 2:
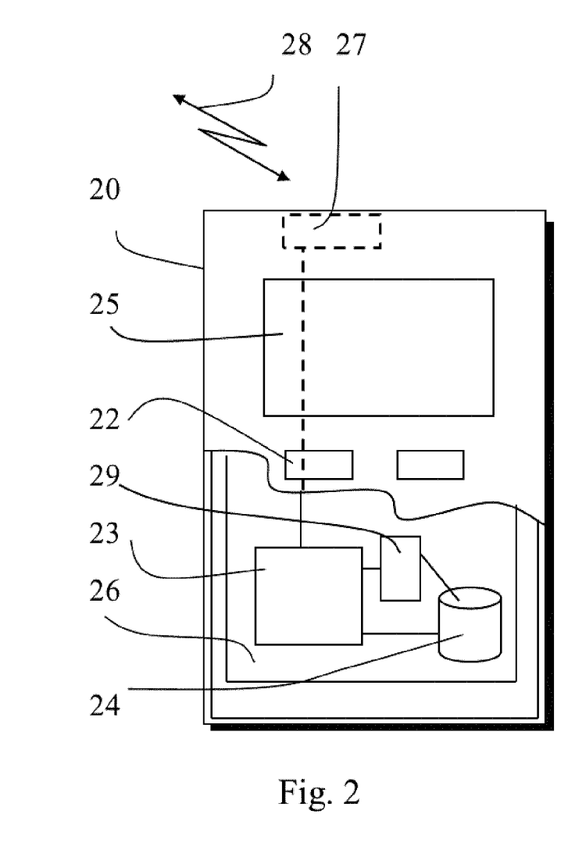
FIG. 2 shows an example of a communication device

FIG. 2 shows a schematic, partially sectioned view of a communication device 20 that a user can use for communications. Such a communication device is often referred to as user equipment (UE) or terminal. The device may be mobile or have a generally fixed location. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A communication device is typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26.

The user may control the operation of the communication device by means of a suitable user interface such as key pad 22, voice commands, touch sensitive screen or pad, combinations thereof or the like. A display 25, a speaker and a microphone are also typically provided. Furthermore, a communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver apparatus is provided with radio capability. The transceiver may be provided for example by means of a radio part and associated antenna arrangement. The antenna arrangement may be arranged internally or externally to the mobile device.

Figure 3:
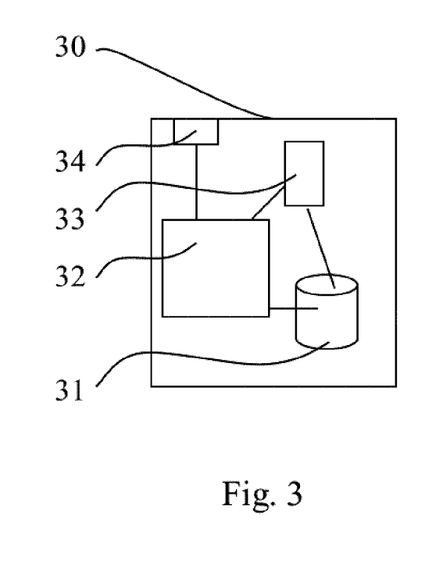
FIG. 3 shows an example of a control apparatus.

FIG. 3 shows an example of a control apparatus 30 for an access node, for example to be coupled to and/or for controlling a station of a radio service area, for example one of the nodes 11 or 12 of FIG. 1. The control apparatus may in some embodiments be part of the base station itself. The control apparatus 30 can be arranged to provide control on configurations, measurements, information processing and/or communication operations of an access node. A control apparatus in accordance with FIG. 3 can be configured to provide control functions in association with generation, communication and interpretation of information regarding carrier aggregation and/or other operations. For providing the desired operation, the control apparatus 30 comprises at least one memory 31, at least one data processing unit 32, 33 and an input/output interface 34. Via the interface the control apparatus can be coupled to the relevant node. The control apparatus 30 can be configured to execute an appropriate software code to provide the control functions.

It should be appreciated that FIG. 1 shows only one scenario where embodiments may be used.

Currently in LTE, intra-cell handovers HO are usually performed for reconfigurations where synchronisation must be ensured between the eNB and the UE in order to avoid any ambiguity on whether the UE uses the old or the new configuration. For instance, because TTI (transmission time interval) bundling impacts HARQ (Hybrid Automatic-Repeat-Request) operation, it is usually enabled or disabled through an intra-cell handover. Similarly, if security keys need to be changed while staying in the same cell (for instance to avoid HFN (hyper frame number wrap-around)), an intra-cell HO is also used. Intra-cell handovers do not differ from regular handover: MAC (media access control), RLC (radio link control) and PDCP (packet data convergence protocol) are reset, security keys are updated and a random access procedure is performed in the target cell. An intra-cell handover is only characterised by signalling a target cell that is identical to the source.

Figure 4:
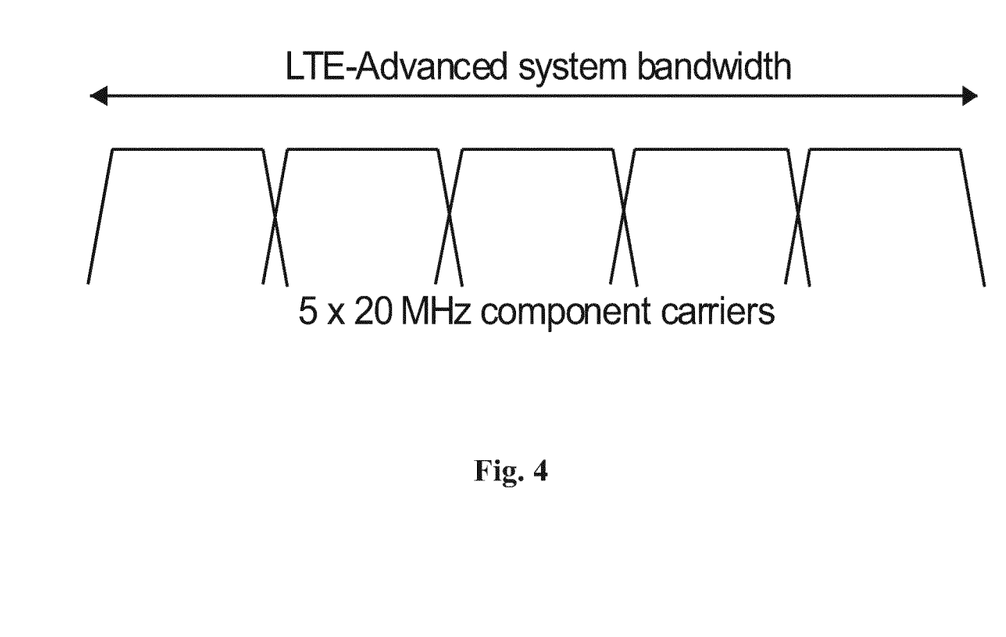
FIG. 4 schematically shows an aggregated carrier.

A feature of LTE-Advanced is that it is capable of providing carrier aggregation. For example, Release 10 (Rel-10) of the E-UTRA specifications introduces Carrier Aggregation (CA), where two or more component carriers (CCs) are aggregated in order to support wider transmission bandwidths up to 100 MHz. In CA it is possible to configure a UE to aggregate a different number of CCs originating from the same eNodeB (eNB) and of possibly different bandwidths in the uplink (UL) and/or downlink (DL). Reference is made to FIG. 4 which shows five component carriers which have been aggregated. Each component carrier is 20 MHz in this example, giving an aggregated bandwidth of 100 MHz.

When CA is configured, the UE only has one RRC connection with the network. At RRC (radio resource control) connection establishment/re-establishment/handover, one serving cell provides the NAS (non access stratum) protocol mobility information (e.g. TAI tracking area identity) and at RRC connection re-establishment/handover, one serving cell provides the security input. The security input may be one ECGI (E-UTRAN cell global identifier), one PCI (physical cell identifier and one ARFCN (absolute radio frequency channel number). This serving cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The configured set of serving cells for a UE therefore consists of one PCell and one or more SCells.

3GPP Release 8 UEs are assumed to be served by one serving cell, while LTE-Advanced terminals can receive or transmit simultaneously on multiple serving cells.

From a UE viewpoint, each uplink resource may only belong to one serving cell. The number of serving cells that can be configured may depend on the aggregation capability of the UE. The PCell and/or SCell(s) may be changed with a handover procedure of the below described embodiments. The PCell is used for transmission of PUCCH. NAS information may be taken from the PCell.

It should be appreciated that some embodiments may be used in a non carrier aggregation scenario. For example in some embodiments, there may be an intra eNB handover, where there is no carrier aggregation.

In Rel-10, one handover procedure is used despite the introduction of carrier aggregation. Regardless of whether the target cell belongs to the configured set of serving cells, a handover is used i.e. a procedure where MAC (media access control), RLC (radio link control) and PDCP (packet data convergence protocol) are reset, security keys are updated and a random access procedure is performed in the target cell.

Lastly, even in scenarios where a baseband pooling architecture such as liquid radio is deployed, a handover is always used regardless of whether the target cell belongs to the same hardware pool as the source or not.

Liquid radio adapts the capacity and coverage of networks to match fluctuating user demand. The radio frequency elements and the antenna become active, sized and positioned according to need, while baseband processing is pooled and sited remotely.

Baseband pooling centralizes the digital signal processing typically done at base station sites and shares it with several sites to ensure that capacity is dynamically used where needed. This enables the network to match the actual capacity needs of end users as they change during the day or over longer periods.

When security keys changes, the PDCP layer that performs the ciphering and Integrity Protection needs to be reset. When the target cell belongs to the same eNB as the source (or belongs to the same hardware pool as the source), a key change is not needed as long as the eNB knows which key to be used, as proposed in 3GPP document R2-102061 PCC Change (unless the procedure is to refresh the keys to avoid HFN wrap around).

Normal reconfiguration without HO has been discussed for intra-cell/intra-"serving cell set" handover but has not been agreed, to avoid an unsynchronized procedure that causes PHY issues, e.g. PUCCH (physical uplink control channel) ambiguity.

Changes for the handover procedure had been discussed for LTE Rel-8 intra-cell/intra-eNB HO in 3GPP document R2-102061 (PCC change, CATT) and for Rel-10 in the context of Carrier aggregation in 3GPP document TS 36.331—Radio Resource Control Protocol. Proposals have been made to omit the Random Access process to the target cell and/or to keep the security key unchanged to avoid L2 reset.

The gain from omitting the RACH (random access channel) process may be limited (several ms for non-contention based RACH). Further, this process may also introduce an ambiguity period during which blind decoding in the eNB is required for PUCCH.

Furthermore avoiding a complete L2 reset may introduce some problems in the MAC layer when the total number of HARQ processes varies due to TTI (transmission time interval) bundling or TDD (time division duplexing) configuration changes between source and target cell.

Some embodiments may provide some lighter handover procedures to minimize UP (user plane) interruption.

Embodiments may provide a procedure that lies between a RRC reconfiguration and handover procedure. This procedure may initiate a MAC reset and a Random Access procedure. This means that a reset of RLC/PDCP may not be required. This may mean that the security keys may not need to be changed.

In one embodiment one bit (or IE information element) is used in the RRC reconfiguration message, independent of the mobility control information. The mobility control information may comprise one or more parameters relevant for network controlled mobility to/within a radio access network. This information may comprise handover information. The mobility control information may comprise any suitable parameters. By way of example only, these parameters may comprises one or more of: a parameter indicating target cell ID, carrier bandwidth, random access channel parameters, uplink bandwidth and/or downlink bandwidth. In the LTE current proposals, this information is referred to as mobilityControlInfo.

In one embodiment, in a RRC reconfiguration message which does not have the mobility control information, a bit indicates that the reconfiguration is a RRC reconfiguration requiring a MAC reset and Random Access procedure (comparable to intra-cell HO, without indicating a target cell as it is same as source cell and without any key change).

Alternative or additionally a RRC reconfiguration message which has mobility control information, a bit indicates that the reconfiguration is a HO with MAC reset and Random Access procedure but without key change and RLC/PDCP reset.

In both cases, the UE resets the MAC and performs a random access procedure using the RACH with the target cell.

Alternatively or additionally, a bit or information element can be added to the mobility control information. This information element is used to cause the UE to reset the MAC and perform the random access procedure. This information element can be added into the mobility control information. In one embodiment, this mobility control information may be provided as part of the RRC reconfiguration message.

It should be appreciated, that information indicating that a MAC reset and random access procedure may be provided by more than one bit or information element or in a format other than by one or more bits.

It should be appreciated that in other embodiments the information which causes a MAC reset and random access procedure may be provided additionally or alternatively in any other suitable message or messages.

Some embodiments may have a RACH procedure which avoids any ambiguity period. The MAC reset may ensure that there is no problem for HARQ operation. As there is no RLC/PDCP reset, there may be less UP interruption. As a result, intra-eNB Handover, which may become the majority of handovers with baseband pooling architecture such as liquid radio, may become more efficient.

Figure 5:
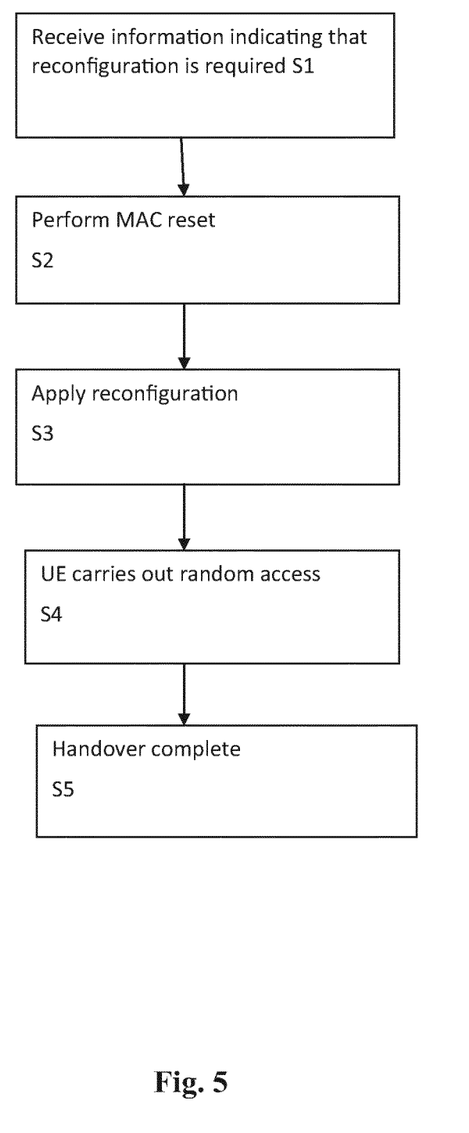
FIG. 5 shows a method of an embodiment.

For example the method may be performed by one or more processor with one or more memory. The embodiment may at least partially be performed by the execution of one or more computer instructions or a computer program. Reference will now be made to FIG. 5 which shows a method of an embodiment.

In step S1, a UE receives reconfiguration information from the base station. This may be provided in an RRC reconfiguration message with an indication which initiates MAC reset and Random access procedure.

In step S2, the UE performs a MAC reset, e.g. resets NDI (new data indication), flushes HARQ buffers, etc as for example specified in 3GPP TS 36.321. It is possible to limit to a subset of the reset options, e.g. only HARQ related operations are reset. In step S3, the reconfiguration is applied, e.g. apply the configuration provided in the reconfiguration message (e.g. enable or disable TTI bundling, etc), change the serving cell to the newly configured serving cell if mobility information is included, and apply the related PHY/MAC configurations. This may be as provided in a radioResourceConfigDedicated message described in 3GPP TS 36.331. In step S4, the UE carries out a random access with the target cell. This may be the same as the source cell, in some embodiments. In other embodiments, this target cell may be different to the source cell. Steps S3 and S4 may be reversed in some embodiments.

In step S5, the UE has completed the synchronised reconfiguration of the serving cell/handover to the target cell.

It should be appreciated that one or more of the above steps may be performed as a single step.

In some embodiments, the reconfiguration message may be with or without a dedicated preamble.

The random access procedure may be triggered by the UL data of a message indicating the RRC reconfiguration has been completed. This message may be RRCReconfigurationComplete message.

One or more of the steps may be performed under the control of one or more processors in association with one or more memories. The steps may be the result of one or more computer instructions being executed by one or more processors.

Embodiments may be used for intra-cell handover, some inter cell handovers and/or some reconfiguration scenarios.

Embodiments may be used in any one of the following situations:
1. An eNB provides more than one cell and a UE is handed over from one of those cells to another.
2. HetNet scenario is a heterogeneous network deployment with both wide area (macro eNB) and local area (micro/pico/home or femto eNB) access points. In some embodiments, a UE may be handed over from a cell of a macro eNB to a cell of an associated home/micro/pico eNB or vice versa. This is by way of example only. The two cells may be a macro cell and a pico cell, a macro cell and a femto cell, a pico cell and a femto cell, a pico cell and a pico cell, or a femto cell and a femto cell.
3. In liquid radio, handover may between different base stations. However the base station resources are pooled and commonly managed.
4. Reconfiguration without mobility e.g. change of physical layer parameters.

Embodiments may be used where there is carrier aggregation in scenarios other than the LTE situations described above. Alternatively or additionally, embodiments may be used where a simplified handover procedure may be used. Some embodiments may be used in scenarios which do not use carrier aggregation.

It should be appreciated that the embodiments may be implemented by one or more computer programs running on one or more processors, hardware, firmware, dedicated circuits or any combinations of two or more of the above. Some embodiments may make use of one or more memories. For example the computer programs may comprise computer executable instructions which may be stored in one or more memories. When run, the computer program(s) may use data which is stored in one or more memories.

It is noted that whilst embodiments have been described in relation to certain architectures, similar principles can be applied to other communication systems where carrier aggregation is provided. For example, this may be the case in application where no fixed access nodes are provided but a communication system is provided by means of a plurality of user equipment, for example in adhoc networks. Also, the above principles can also be used in networks where relay nodes are employed for relaying transmissions. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
   in response to an indication that a reconfiguration is required, wherein the indication indicates that keys need not be reset, performing, with a user equipment in a wireless communications system, a media access control reset without performing at least one of a radio link control reset or a packet data convergence protocol reset, wherein the reconfiguration being required comprises the user equipment to perform one of:
   an intra cell handover when the user equipment is using carrier aggregation;
   reconfiguring without mobility; or
   an inter cell handover, where said cells are commonly managed;
   performing, with the user equipment, a random access procedure in response to the indication that the reconfiguration is required; and
   performing, with the user equipment, the reconfiguration, wherein said reconfiguration is performed after said media access control reset and after said random access procedure.

2. The method of claim 1, further comprising:
   receiving the indication in a reconfiguration message and responsive to said reconfiguration message performing the media access control reset and/or the random access procedure.

3. The method of claim 2, further comprising:
   responsive to said reconfiguration message performing the reconfiguration.

4. The method of claim 2, wherein said reconfiguration message comprises at least one information element, responsive to which information element the media access control reset and/or the random access procedure are performed.

5. The method of claim 1, wherein said media access control reset comprises performing at least one of resetting a new data indication or flushing of a hybrid automatic repeat request buffer.

6. The method of claim 1, wherein the performing of the reconfiguration comprises at least one of enabling transmission time interval bundling, disabling transmission time interval bundling, or changing a serving cell to a newly configured serving cell.

7. A computer program product embodied on a non-transitory computer-readable medium in which a computer program is stored that, when being executed with a computer, is configured to perform the method of claim 1.

8. An apparatus comprising at least one processor and at least one non-transitory memory including computer program code, the at least one memory and computer program code configured to with the at least one processor cause the apparatus at least to:
  in response to an indication that a reconfiguration is required, wherein the indication indicates that keys need not be reset, perform a media access control reset without performing at least one of a radio link control reset or a packet data convergence protocol reset, wherein the reconfiguration being required comprises a user equipment in a wireless communications system to perform one of:
    an intra cell handover when the user equipment is using carrier aggregation;
    reconfiguring without mobility; or
    an inter cell handover, where said cells are commonly managed;
  perform a random access procedure in response to the indication that the reconfiguration is required; and
  perform the reconfiguration, wherein said reconfiguration is performed after said media access control reset and after said random access procedure.

9. The apparatus of claim 8, wherein the at least one memory and computer program code are configured to with the at least one processor receive the indication in a reconfiguration message and responsive to said reconfiguration message to perform the media access control reset and/or the random access procedure.

10. The apparatus of claim 9, wherein the at least one memory and computer program code are configured to with the at least one processor perform the reconfiguration responsive to said reconfiguration message.

11. The apparatus of claim 9, wherein said reconfiguration message comprises at least one information element, and the at least one memory and computer program code are configured to with the at least one processor perform, responsive to said information element, the media access control reset and/or the random access procedure.

12. The apparatus of claim 8, wherein the at least one memory and computer program code are configured to with the at least one processor perform said media access control reset comprising performing at least one of resetting a new data indication or flushing of a hybrid automatic repeat request buffer.

13. The apparatus of claim 8, wherein performing the reconfiguration comprises at least one of enable or disabling transmission time interval bundling, changing a serving cell to a newly configured serving cell.

14. A user equipment comprising the apparatus of 8.

15. A method comprising:
  receiving, with a device in a mobile communications network, an indication, wherein the indication notifies the device that a reconfiguration is required and provides the device with reconfiguration information, and wherein the indication indicates that keys need not be reset;
  in response to the receiving, performing a media access control reset without performing a radio link control reset, without performing a packet data convergence protocol reset, or without performing both the radio link control reset and the packet data convergence protocol reset wherein the reconfiguration being required compromises a user equipment to perform one of:
    an intra cell handover when the device is using carrier aggregation;
    reconfiguring without mobility; or
    an inter cell handover, where said cells are commonly managed;
  applying the reconfiguration; and
  carrying out a random access procedure, wherein said reconfiguration is applied after the performing of said media access control reset and after the carrying out of said random access procedure.

16. A computer program product embodied on a non-transitory computer-readable medium in which a computer program is stored that, when being executed with a computer, is configured to perform the method of claim 15.

* * * * *